US008914225B2

(12) United States Patent
Caskey et al.

(10) Patent No.: US 8,914,225 B2
(45) Date of Patent: Dec. 16, 2014

(54) MANAGING VEHICLES ON A ROAD NETWORK

(71) Applicant: International Business Machines Corporation, Armonk, NY (US)

(72) Inventors: Sasha P. Caskey, New York, NY (US); Dimitri Kanevsky, Ossining, NY (US); James R. Kozloski, New Fairfield, CT (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/705,025

(22) Filed: Dec. 4, 2012

(65) Prior Publication Data

US 2014/0156176 A1 Jun. 5, 2014

(51) Int. Cl.

| | |
|---|---|
| ***G06F 7/00*** | (2006.01) |
| ***G06F 19/00*** | (2011.01) |
| ***G05D 1/00*** | (2006.01) |
| ***G08G 1/00*** | (2006.01) |
| *G06G 7/76* | (2006.01) |

(52) U.S. Cl.
CPC ... *G08G 1/00* (2013.01); *G06G 7/76* (2013.01)
USPC ................. 701/117; 701/23; 701/93; 701/96; 701/118; 701/119; 701/120; 701/121

(58) Field of Classification Search
CPC .................................. G06G 7/76; G06G 1/00
USPC ........ 701/23, 93, 96, 117, 119, 118, 120, 121
See application file for complete search history.

(56) References Cited

U.S. PATENT DOCUMENTS

| | | | | |
|---|---|---|---|---|
| 4,665,395 | A | 5/1987 | Van Ness | |
| 5,422,473 | A | 6/1995 | Kamata | |
| 5,646,855 | A | 7/1997 | Jones et al. | |
| 5,680,122 | A * | 10/1997 | Mio | 340/932 |
| 5,987,379 | A | 11/1999 | Smith | |
| 6,026,347 | A * | 2/2000 | Schuster | 701/301 |

(Continued)

OTHER PUBLICATIONS

Zhang,Q. et al., "Distributed Control of Coordinated Path Tracking for Networked Nonholonomic Mobile Vehicles," IEEE Transactions on Industrial Informatics, Sep. 18, 2012, 12 pp., Copyright 2011 IEEE.

(Continued)

*Primary Examiner* — Calvin Cheung
*Assistant Examiner* — Angelina Shudy
(74) *Attorney, Agent, or Firm* — Jon A. Gibbons; Fleit Gibbons Gutman Bongini & Bianco PL

(57) ABSTRACT

A system and method for managing vehicles on a road network can include a processor that performs operations including accessing a matrix of vehicle parameters of a plurality of communicating vehicles on the road network and representing the plurality of communicating vehicles in a graph with a plurality of nodes corresponding to the plurality of communicating vehicles and edges corresponding to the vehicle parameters. The system and method can include partitioning, with a processing device, the graph to reduce disruptions to the road network below a threshold level to support safe and efficient traffic flow and assigning one or more exclusion zones within the road network to each partition of the graph by associating the vehicle parameters for each vehicle.

16 Claims, 6 Drawing Sheets

(56) References Cited

U.S. PATENT DOCUMENTS

| | | | |
|---|---|---|---|
| 6,127,947 | A | 10/2000 | Uchida et al. |
| 6,150,961 | A * | 11/2000 | Alewine et al. ............ 340/995.1 |
| 6,333,703 | B1 * | 12/2001 | Alewine et al. .......... 340/995.13 |
| 6,397,141 | B1 * | 5/2002 | Binnig .......................... 701/117 |
| 6,470,262 | B2 | 10/2002 | Kerner et al. |
| 6,799,100 | B2 * | 9/2004 | Burns et al. ..................... 701/25 |
| 6,973,384 | B2 * | 12/2005 | Zhao et al. .................... 701/117 |
| 7,071,839 | B2 * | 7/2006 | Patel et al. .................... 340/933 |
| 7,230,545 | B2 * | 6/2007 | Nath et al. ................. 340/932.2 |
| 7,860,639 | B2 | 12/2010 | Yang |
| 7,979,172 | B2 | 7/2011 | Breed |
| 8,054,181 | B2 | 11/2011 | Van Wyck Loomis et al. |
| 8,121,749 | B1 | 2/2012 | Agrawal et al. |
| 8,514,825 | B1 | 8/2013 | Addepalli et al. |
| 8,706,388 | B2 * | 4/2014 | Pschierer et al. ............. 701/120 |
| 2002/0057195 | A1 | 5/2002 | Yamamura |
| 2002/0059017 | A1 | 5/2002 | Yamane et al. |
| 2002/0143461 | A1 | 10/2002 | Burns et al. |
| 2003/0153338 | A1 | 8/2003 | Herz et al. |
| 2003/0173172 | A1 * | 9/2003 | Stephan et al. ................. 191/10 |
| 2003/0225516 | A1 * | 12/2003 | DeKock et al. ............... 701/214 |
| 2003/0227395 | A1 | 12/2003 | Zeineh |
| 2004/0083037 | A1 | 4/2004 | Yamane et al. |
| 2004/0093291 | A1 | 5/2004 | Bodin |
| 2004/0102896 | A1 | 5/2004 | Thayer et al. |
| 2004/0210757 | A1 | 10/2004 | Kogan et al. |
| 2006/0155427 | A1 | 7/2006 | Yang |
| 2006/0155428 | A1 * | 7/2006 | Imai .................................. 701/1 |
| 2007/0048084 | A1 * | 3/2007 | Jung et al. ......................... 404/9 |
| 2007/0115868 | A1 * | 5/2007 | Chen et al. .................... 370/315 |
| 2007/0164896 | A1 * | 7/2007 | Suzuki et al. ................... 342/70 |
| 2008/0161987 | A1 | 7/2008 | Breed |
| 2009/0009321 | A1 | 1/2009 | McClellan et al. |
| 2009/0048769 | A1 * | 2/2009 | Xu et al. ....................... 701/118 |
| 2010/0256852 | A1 * | 10/2010 | Mudalige ........................ 701/24 |
| 2010/0315217 | A1 | 12/2010 | Miura et al. |
| 2011/0087433 | A1 | 4/2011 | Yester |
| 2011/0130945 | A1 | 6/2011 | Deedy et al. |
| 2011/0184596 | A1 | 7/2011 | Andreasson |
| 2011/0196571 | A1 | 8/2011 | Foladare et al. |
| 2011/0210973 | A1 * | 9/2011 | Di Crescenzo et al. ....... 345/440 |
| 2012/0029805 | A1 | 2/2012 | Schunder et al. |
| 2012/0044063 | A1 | 2/2012 | McClellan et al. |
| 2012/0086582 | A1 | 4/2012 | Durekovic et al. |
| 2012/0108163 | A1 | 5/2012 | Bai et al. |
| 2012/0120883 | A1 | 5/2012 | Chen et al. |
| 2012/0253867 | A1 * | 10/2012 | Davidson ..................... 705/7.12 |
| 2012/0256770 | A1 * | 10/2012 | Mitchell ....................... 340/989 |
| 2013/0006464 | A1 * | 1/2013 | Speiser ........................... 701/25 |
| 2013/0013203 | A1 * | 1/2013 | Sumizawa et al. ............ 701/533 |
| 2013/0066511 | A1 * | 3/2013 | Switkes et al. .................. 701/28 |
| 2013/0080041 | A1 * | 3/2013 | Kumabe ........................ 701/117 |
| 2013/0096815 | A1 * | 4/2013 | Mason et al. ................. 701/400 |
| 2013/0116915 | A1 | 5/2013 | Ferreira et al. |
| 2013/0116916 | A1 * | 5/2013 | Kickbusch .................... 701/118 |
| 2013/0124064 | A1 * | 5/2013 | Nemoto .......................... 701/96 |
| 2013/0144516 | A1 * | 6/2013 | Sato .............................. 701/118 |
| 2013/0191331 | A1 * | 7/2013 | Champredonde et al. .... 707/609 |
| 2013/0245926 | A1 * | 9/2013 | Heaps et al. .................. 701/119 |
| 2013/0261948 | A1 * | 10/2013 | Funabashi ..................... 701/300 |
| 2013/0325344 | A1 | 12/2013 | Yester |

OTHER PUBLICATIONS

Horrell, P., "Intelligence: Behold the All-Seeing, Self-Parking, Safety-Enforcing, Networked Automobile," Popular Science, posted on line Sep. 24, 2004.

Gil, A.E., et al., "Cooperative Scheduling of Tasks for Networked Uninhabitated Autonomous Vehicles," Proceedings of the 42nd IEEE Conference on Decision and Control, Maui, Hawaii, USA, Dec. 2003, 0-7803-7924-1/03 copyright 2003 IEEE.

Feddema,L J.T., "Decentralized Control of Cooperative Robotic Vehicles: Theory and Application," IEEE Transactions on Robotics and Automation, vol. 18, No. 5, Oct. 2002., 1042-296/02, copyright 2002 IEEE.

Dillow, C., "Dashboard-Mounted Smartphones Network Together to Watch for Red Light Patterns, Help Drivers Commute Efficiently," Popular Science, posted on-line Aug. 26, 2011.

Non Final Office Action dated Mar. 13, 2014 received for U.S. Appl. No. 14/030,532.

Final Office Action dated Jun. 3, 2014 for U.S. Appl. No. 14/030,532.

Quinlan, M., "Reality check: the self-driving car—Vehicles that navigate themselves expected this decade," CBC News, Posted Jun. 11, 2012.

* cited by examiner

200

| Vehicle | Current Location | Dest | Max/Min Speed | Min. Distance | Wind Drag | Engine Parameter | Braking Parameter | Bandwidth | Interface Type | Environ. Condition | Governmt Rule 1 to n |
|---|---|---|---|---|---|---|---|---|---|---|---|
| Prius(A) | x1, y1 | pt1 | 90 | 30 | 0.5 | Z | 10 | n, g, 4G | USB, wifi | all | 75mph |
| Leaf(B) | x2, y2 | pt1 | 85 | 30 | 0.5 | Z | 10 | n, g, 4G | wifi | all | 75mph |
| Civic(C) | x3, y3 | pt1 | 90 | 35 | 0.5 | Z | 10 | n, g, 4G | wifi | day only | 75mph |
| BMW(D) | x4, y4 | pt2 | 95 | 35 | 0.5 | Z | 10 | n, g, 4G | USB, wifi | day only | 75mph |
| Regal(E) | x5, y5 | pt2 | 95 | 35 | 0.5 | Z | 10 | n, g, 4G | USB, wifi | day only | 75mph |
| Volt(F) | x6, y6 | pt2 | 85 | 30 | 0.5 | Z | 10 | n, g, 4G | USB, wifi | all | 75mph |
| Fisker(G) | x7, y7 | pt3 | 90 | 35 | 0.5 | Z | 10 | n, g, 4G | USB, wifi | all | 75mph |
| Insight(H) | x8, y8 | pt2 | 85 | 35 | 0.5 | Z | 10 | n, g, 4G | wifi | all | 75mph |
| Optima(I) | x9, y9 | pt2 | 85 | 35 | 0.5 | Z | 10 | n, g, 4G | wifi | day only | 75mph |
| TeslaS(J) | x0, y0 | pt1 | 90 | 30 | 0.5 | Z | 10 | n, g, 4G | USB, wifi | all | 75mph |

FIG.2

MANAGING VEHICLES ON A ROAD NETWORK

BACKGROUND

The present invention generally relates to road access, and more particularly relates to a system and method for managing vehicles on a road network.

The future of autonomous automobiles has begun, but with many roadblocks. As newer vehicles take the road, their ability to interact with existing cars and infrastructure as well as interact with other newer vehicles will leave a jumble of fragmented solutions for efficient traffic flow. Communication and control among and between vehicles is virtually non-existent in current vehicles and in roadways hosting such vehicles.

BRIEF SUMMARY

In one example, a method for managing vehicles on a road network can involve a processing device in a communication network. The method can include accessing a matrix of vehicle parameters of a plurality of communicating vehicles on the road network and representing the plurality of communicating vehicles in a graph with a plurality of nodes corresponding to the plurality of communicating vehicles and edges corresponding to the vehicle parameters. The method can further include partitioning, with a processing device, the graph to reduce disruptions to the road network below a threshold level to support safe and efficient traffic flow and assigning one or more exclusion zones within the road network to each partition of the graph by associating the vehicle parameters for each vehicle.

In another example, a system for managing one or more exclusion zones on a road network includes a memory storing computer instructions and a processor communicatively coupled to the memory. The processor, responsive to executing the computer instructions, performs operations. The operations can include maintaining a list of vehicle parameters of a plurality of communicating vehicles on the road network, representing the plurality of communicating vehicles in a graph with a plurality of nodes corresponding to the plurality of communicating vehicles and edges corresponding to the vehicle parameters, partitioning the graph, and assigning the one or more exclusion zones within the road network to each partition of the graph by associating the vehicle parameters of each vehicle.

In yet another example, a computer readable storage medium, including computer instructions which, responsive to being executed by a processor, cause the processor to perform operations comprising maintaining a list of vehicle parameters of a plurality of communicating vehicles on a road network, representing the plurality of communicating vehicles in a graph with a plurality of nodes corresponding to the plurality of communicating vehicles and edges corresponding to the vehicle parameters, partitioning the graph, and assigning the one or more exclusion zones within the road network to each partition of the graph by associating the one or more exclusion zones with vehicle parameters for each vehicle

BRIEF DESCRIPTION OF THE DRAWINGS

The accompanying figures generally include similar reference numerals referring to identical or functionally similar elements throughout the separate views, and which together with the detailed description below are incorporated in and form part of the specification, serve to further illustrate various examples and to explain various principles and advantages all in accordance with the present invention, in which:

FIG. 2 shows a list or matrix of vehicle parameters or interfaces according to one example of the present invention;

DETAILED DESCRIPTION

Figure 1:
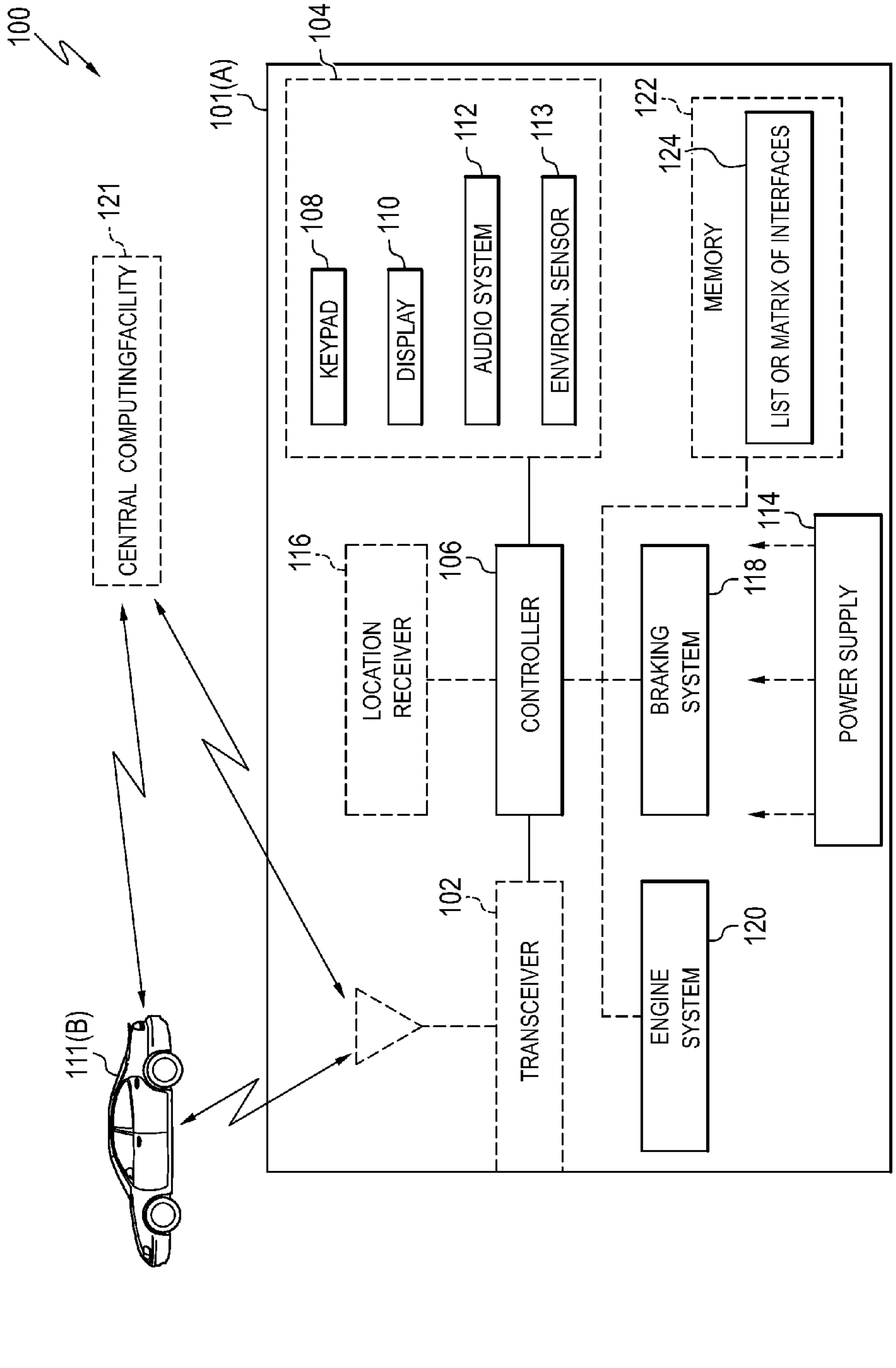
FIG. 1 is a block diagram illustrating one example of a system and device according to one example of the present invention.

FIG. 1 shows one example of an operating environment 100 applicable to various examples of the present invention. FIG. 1 depicts an illustrative example of a portable electronic device such as a communication device 101 in a vehicle (A) in communication with a similar communication device 111 that can reside in vehicle (B). The communication devices 101 and 111 can communicate directly as part of an ad hoc network or can communicate through, or with the assistance of, a central computing facility 121 as part of a communication network. The communication device 100 can include a wireless transceiver 102 having transmitter and receiver sections (herein transceiver 102), a user interface (UI) 104, a power supply 114, a location receiver 116, a braking system 118, an engine system 120, a memory 122 including a list or matrix 124 of vehicle parameters or interfaces, and a controller 106 for managing operations thereof. The braking system 118 can provide numerous parameters associated with a particular vehicle including parameters that may be associated with anti-lock braking systems (ABS) or other types of braking systems. The engine system 120 can provide one or more parameters such as speed, torque, rotations per minute, efficiency, and type among other parameters. For example, a hybrid engine, a gas combustion engine, a diesel engine, or an electric motor can have various parameters that may or may not be compatible for use in a platoon or clique of vehicles operating in an exclusion zone.

The transceiver 102 can support short-range or long-range wireless access technologies such as Bluetooth®, ZigBee®, WiFi, Digital Enhanced Cordless Telecommunications (DECT), or cellular communication technologies, just to mention a few. Cellular technologies can include, for example, code division multiple access-1X (CDMA-1X), Universal Mobile Telephone System/High Speed Downlink Packet Access (UMTS/HSDPA), Global System for Mobile/General Packet Radio System (GSM/GPRS), time division multiple access/Enhanced Data GSM Environment (TDMA/EDGE), Evolution Data Optimized (EV/DO), Worldwide Interoperability for Microwave Access (WiMAX), Software Defined Radio (SDR), Long Term Evolution (LTE), as well as other next generation wireless communication technologies as they arise. The transceiver 102 can also be adapted to support circuit-switched wireline access technologies (such as Public Switched Telephone Network (PSTN)), packet-switched wireline access technologies (such as Transmission Control Protocol/Internet Protocol (TCP/IP), Voice over Internet Protocol (VoIP), etc.), and combinations thereof.

The UI 104 can include several optional elements including a depressible, touch-sensitive or virtual keypad 108 with a navigation mechanism such as a roller ball, an optical navigation module (i.e. trackpad), a joystick, a mouse, or a navigation disk for manipulating operations of the communication device 100. The keypad 108 can be an integral part of a housing assembly of the communication device 100 or an independent device operably coupled thereto by a tethered wireline interface (such as a Universal Serial Bus (USB) cable) or a wireless interface supporting, for example, Bluetooth. The keypad 108 can represent a numeric keypad commonly used by phones, and/or a QWERTY keypad with alphanumeric keys. The UI 104 can further optionally include a display 110 such as monochrome or color Liquid Crystal Display (LCD), Organic Light Emitting Diode (OLED) or other suitable display technology for conveying images to an end user of the communication device 100. In an example where the display 110 is touch-sensitive, a portion or all of the keypad 108 can be presented by way of the display 110 with navigation features.

The display 110 can use touch screen technology to also serve as a user interface for detecting user input (e.g., touch of a user's finger). As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used control the manipulation of the GUI elements. The display 110 can be an integral part of the housing assembly of the communication device 100 or an independent device communicatively coupled thereto by a tethered wireline interface (such as a cable) or a wireless interface.

The UI 104 can also include an environmental sensor 113 which can include an accelerometer, a gyroscope, a GPS sensor, an inclinometer, an optical sensor, audio-spectrum sensors, ultrasonic transmitters and sensors, an infrared or other proximity sensor, or another sensor which can detect, for example, orientation or motion. The environmental sensor 113 can also include a thermometer, a pressure gauge or other environmental sensor. The UI 104 can further optionally include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The environmental sensor 113 within the UI 104 can also be a charged coupled device (CCD) camera for capturing still or moving images or for just capturing ambient light conditions.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies.

The location receiver 116 can utilize common location technology such as a global positioning system (GPS) receiver capable of assisted GPS for identifying a location of the communication device 100 based on signals generated by a constellation of GPS satellites, which can be used for facilitating location services such as navigation.

Note that the operational environment 100 is not limited to the system shown. The operational environment can simply include any electronic communication device or devices enabling the communication of vehicle parameters between at least two vehicles. The communication device 101 or 111 as described herein can operate with more or less of the circuit components shown in FIG. 1, depicted illustratively by the hash lines. These variant examples are contemplated as shown and described herein.

The system 100 allows vehicles to join both a wireless computer network and a particular roadway network simultaneously. As newer vehicles take to the road, they may form "cliques" on a highway where they exclude incompatible vehicles or other older vehicles unable to present the necessary vehicle parameters or interfaces in order to join. The end result is that certain roads or portions of roads will become inaccessible to older vehicles, since they will be unable to pass network security measures set up on an ad hoc basis.

As vehicle transportation networks transform from roadways used on an ad hoc basis by vehicles controlled almost entirely by human drivers into paths for autonomous vehicles controlled wholly by on board and remote computational resources, an interim period will surely occur when roads must be shared by both autonomous and human controlled vehicles. There may be vehicles that are semi-autonomous that may share the road with both autonomous and human controlled vehicles. Furthermore, since autonomous vehicles may rely on standard interfaces to other autonomous (or semi-autonomous) vehicles and computing resources, it should be expected that these interfaces or vehicle parameters will evolve and change as newer vehicles enter the market.

These standard interfaces or vehicle parameters may communicate details such as vehicle location, speed, and next actions, which then allows other vehicles to plan their own actions and remote resources to schedule and control the actions of groups of vehicles effectively. An example of the various vehicle parameters that can be considered are illustrated in the matrix listing 200 of FIG. 2 which includes vehicle, current location, destination, minimum and maximum speed, minimum distance, wind drag factor, engine parameters, braking parameters, bandwidth capabilities, communication interface types, environmental conditions, and governmental regulations. Note that the parameters listed in FIG. 2 are not real parameter listings, but are just provided as a hypothetical examples. Central communication networks can look at the actions of all vehicles on the road and traffic to different destinations, in scheduling the actions of groups of vehicles. Without the ability to exploit these standard interfaces in a controlled road network environment, a problem arises in how to maintain efficient and effective autonomous vehicle transportation networks that can leverage the full advantages of vehicle to vehicle and vehicle to central facility communication networks.

As new vehicles are designed and sold, they may no longer share the same interfaces or vehicle parameters with older vehicles. Furthermore, even if their interfaces or parameters are upgraded, older vehicles might not meet certain standards that are required to operate safely with a group of newer vehicles. To address this danger, newer vehicles could avoid roads or sections of roads where older vehicles are common and instead form ad hoc road and communication networks only with vehicles that meet certain requirements. With these ad hoc communication networks, special roads, or sections of roads which have been "taken over" by newer vehicles would need to be flagged as such, and for safety purposes, restricted on an ad hoc basis only to these vehicles. Other roads or road sections might be similarly flagged for older vehicles, or even human operated vehicles.

The problem then is how to simultaneously construct an ad hoc computer network and ad hoc vehicle road network, based in part on GPS and communication between vehicles competing for the same roadway. Once constructed, roads may be flagged and vehicles operated more safely among other vehicles that support the same interfaces needed to navigate and perform other driving functions.

The examples herein can generally relate to vehicles such as cars which are communicatively coupled to each other and where a driver relinquishes all or some of the control to a shareway or roadway such that the vehicle does not necessarily rely on the driver to follow directions or instructions. In this regard, the vehicles can form exclusion zones in an ad-hoc manner in some examples and can form exclusion zones in a centralized fashion in other examples depending on the network configurations available. In some examples, the system directs vehicles for navigation by the shareway, thus preventing the possibility of human error. Further, some of the examples herein can allow not only for more efficient traffic patterns (controlled by the shareway itself), but can also promote more efficient energy usage by using only a few of the engines to power the shareway (instead of each car powering itself.)

Several examples can utilize several components which together provide the functions of 1) creating ad hoc communication networks between vehicles or cars on an open roadway 2) establishing, based on analysis of the interfaces or parameters supported by participating networked vehicles, a set of security requirements in order for other vehicles to join the network, 3) identifying the geographical boundaries of the ad hoc, secured network, and 4) establishing a policy prohibiting vehicles that are unable to pass the security requirements of the network and unable to join the network and thereby discouraged or prevented from entering and driving within the geographical boundaries of the network.

In yet other examples, the components of a system can include a communicative coupling between vehicles that supports and discovers interfaces or vehicle parameters to onboard vehicle signals and that creates ad hoc communication networks with other vehicles, or a communicative coupling between vehicles and remote computing facilities that allows communication of onboard vehicle information, such as geographical location. Some examples can include a security component that determines if a vehicle attempting to communicate with another vehicle supports key interfaces or parameters used by that vehicle in its current communication network. Most examples would include a geographical mapping component that continually establishes geographical boundaries around currently secured communication networks and a flagging component that determines when a communication network should be made geographically isolated based on criteria set by the interfaces parameters upon which the network is built, the networks size, and a risk factor computed derived from these parameters. Some examples can include an onboard alert within the vehicles or at a central location that notifies other vehicles when they are entering the geographic boundaries of a flagged vehicle network and whether they have a necessary security clearance to join the communication network and consequently the road network.

Figure 3:
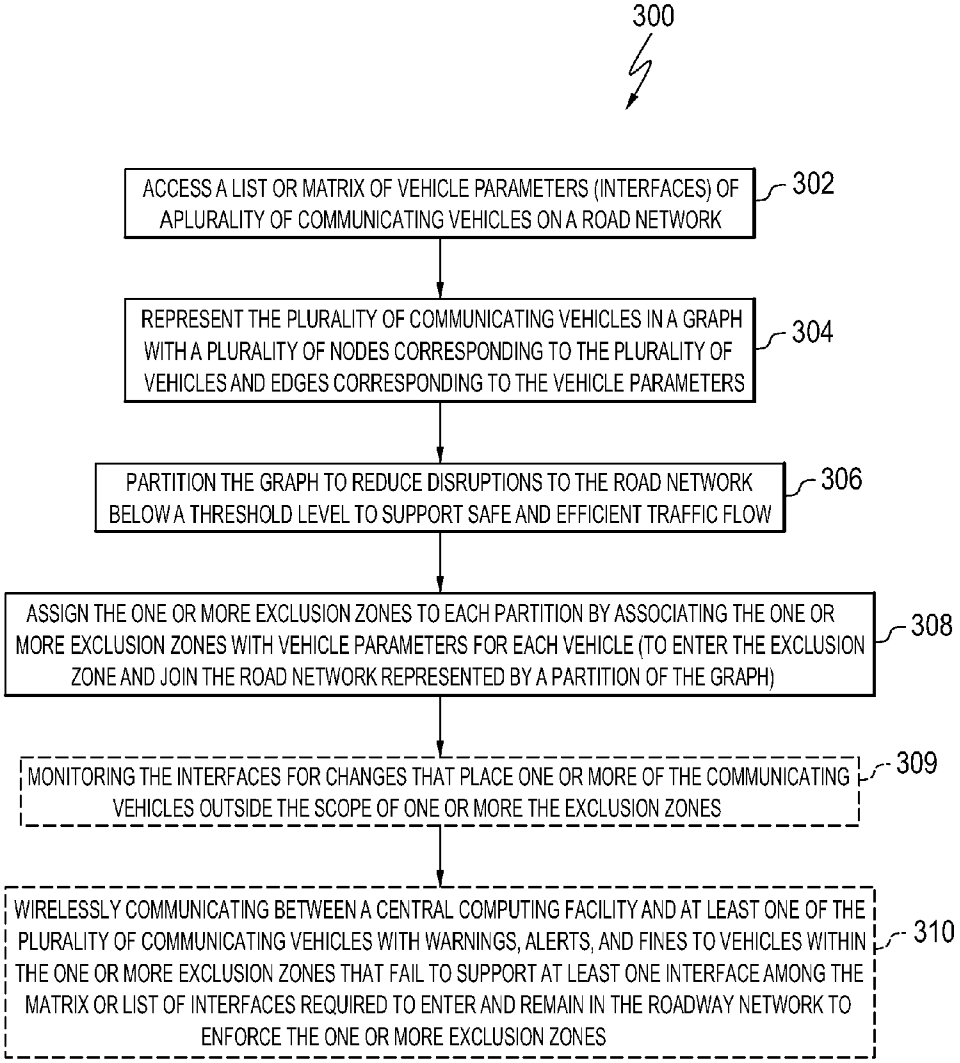
FIG. 3 is an operational flow diagram illustrating various method examples according to the present invention.

Referring now to FIG. 3, the flow diagram 300 illustrates the architecture, functionality, and operation of possible implementations of systems, methods, and computer program products according to various examples herein. In this regard, each block in the flow diagram 300 may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

FIG. 3 is an operational flow diagram illustrating one example of managing vehicles on a road network. The operational flow diagram 300 of FIG. 3 begins at step 302 by accessing a matrix of vehicle parameters (as illustrated in FIG. 2) of a plurality of communicating vehicles on the road network. The matrix of vehicle parameters can be a list of inputs for each of the communicating vehicles. The list of inputs can include a model vehicle, a current location coordinate, a destination location coordinate, a determined speed, a determined minimum distance between vehicles, a determined wind drag factor, an engine parameter, a braking parameter, a communication bandwidth parameter, an environmental condition, and a governmental regulation. The method then flows to step 304 by representing the plurality of communicating vehicles in a graph with a plurality of nodes corresponding to the plurality of communicating vehicles and edges corresponding to the vehicle parameters. The "representing" of the graph can come in many forms that accounts for the various vehicle parameters, established exclusion zones, and geographic location. For example, representing can be a matrix or list of parameters associated with the geographic boundaries of an exclusion zone. The graph can be a sophisticated 3-dimensional graph or can be represented in two dimensions. It should be noted that the steps shown in FIG. 3 are not required to be performed in any particular order and one or more steps can be performed in parallel. Further note that many of the steps illustrated can be considered optional.

At step 306, the operational flow can further perform the partitioning of the graph to reduce disruptions to the road network below a threshold level to support safe and efficient traffic flow. The partitioning can involve the use of any number of graph partitioning algorithms or techniques and is not necessarily limited to a particular algorithm. The partitioning of the graph can be done to reduce disruptions to the road network below a threshold level to support safe and efficient traffic flow. At step 308, the method can then assign one or more exclusion zones within the road network to each partition of the graph by associating the vehicle parameters for each vehicle.

In other examples at step 309, the method 300 can include monitoring the interfaces or vehicle parameters for changes that place at least one communicating vehicle among the plurality of communicating vehicles outside the scope of one or more exclusion zones. At step 310, the method can optionally include wirelessly communicating between a central computing facility and at least one of the plurality of communicating vehicles with warnings, alerts, and fines to vehicles within the one or more exclusion zones that fail to support at least one interface among the matrix or list of interfaces required to enter and remain in the roadway network to enforce the one or more exclusion zones. The step of wirelessly communicating can be used to enforce the one or more exclusion zones established. For example, fines can be levied to one or more vehicles within an exclusion zone that fails to support at least one interface for a predetermined time period. The operational flow diagram 300 as described herein can include more or less of the elements shown in FIG. 3, where optional steps are depicted illustratively by the hash lines.

The method 300 can be performed by one or more processing devices. In one example, the processing device can be in a remote server in communication with the plurality of communicating vehicles. In another example, a number of processing devices in one or more communication devices forming an ad hoc network can provide communication access among the plurality of communicating vehicles.

Figure 4:
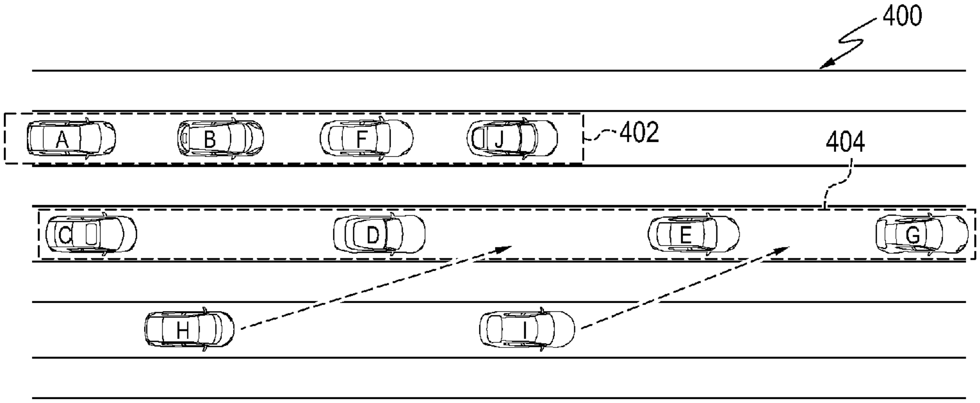
FIGS. 4-6 show various examples of a plurality of communicating vehicles in and out of exclusions zones, according to various examples of the present invention.

Operationally, with reference to the system 400 of FIG. 4, a vehicle A can encounter another vehicle B (or additional vehicles (F and J)) along a roadway. The communicative coupling components on both vehicles A and B can interrogate each other and discover vehicle parameters or interfaces that are commonly share and compatible. An ad hoc communication network can be established, whereby interfaces or vehicle parameters between vehicles A and B communicate essential information, allowing the vehicles to operate in a relation to one another in a way different than if the information was not communicated. In other words, the vehicles A and B and other vehicles meeting a particular standard form a "clique" and legally reside in an exclusion zone 402. A security component either on vehicles A or B (or F or J) or in a remote computing facility communicatively coupled to the vehicles determines what vehicle parameters interfaces among the vehicles in the clique are desired for new vehicles to join the ad hoc network. The security component can reject vehicles from the network based on their lack of support for interfaces vehicle parameters for the vehicles A, B, F or J.

Other vehicles can join the network, and a geographical mapping component continually updates a map of the geographical boundaries of the ad hoc network as long as the other vehicles meet the standards of the clique. For example, vehicles C, D, E, and G can form another clique of vehicles within an exclusion zone 404. These vehicles may have a 35 foot distance minimum between each other as one of the vehicle parameters. Vehicles H and I can join the clique enter the exclusion zone 404 as long as they meet the standards of the exclusion zone 404. The vehicles in the clique within the exclusion zone can communicate amongst themselves to make appropriate adjustments to allow the addition of vehicles H and I.

In another scenario, a flagging component onboard the vehicles or in the remote computing facility can determine that network size S has exceeded a threshold Ts, and that the geographical boundaries of the network G are within some tolerance level Tg for flagging, and flags the network as geographically restricted. The security component can be notified of the flagging, and relays to the vehicles that they may operate in the geographically restricted mode, allowing certain features of vehicle operation to be activated, allowing for faster or more efficient driving in the geographically secured context within the exclusion zone 402 or 404 as appropriate. More particularly, with reference to the system 500 of FIG. 5, an exclusion zone 502 may have a given threshold Ts of five (5) vehicles and may have a particular geographic boundary as shown. Vehicles A, B, F, and J as currently located in the exclusion zone 502 may meet a particular tolerance level Tg for the particular geographic boundary for exclusion zone 502, but the addition of vehicles H and I may create one or more flags. One flag may indicate that the number of vehicles in the exclusion zone 502 has exceeded the threshold Ts requiring the shifting of at least one vehicle out of the exclusion zone 502. Another flag may indicate that the geographic boundaries that include vehicles A, B, F, J, H, and I have exceeded a tolerance level Tg requiring the shifting of one or more vehicles out of the exclusion zone 502 or alternatively that the spacing between the plurality of vehicles require adjustment within allowable parameters (if possible). A simple solution can shift the vehicles H and I out of the exclusion zone 502 to another exclusion zone as explained below, but other alternatives are within contemplation of the examples herein as long as the particular standards or parameters of an exclusion zone are met.

Figure 5:
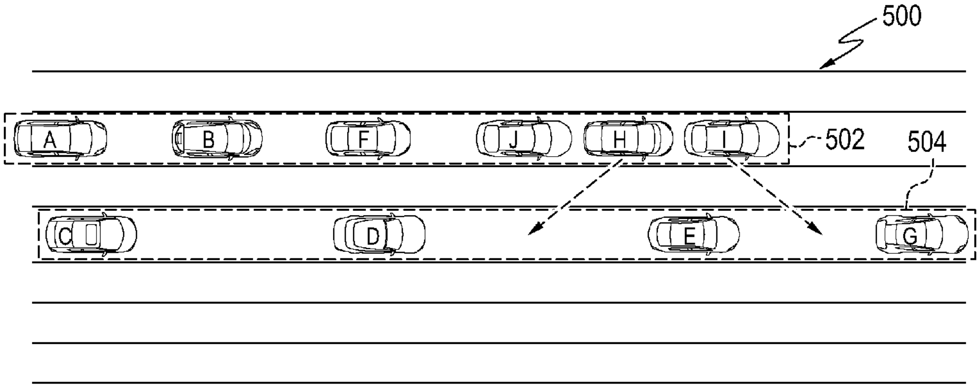

Referring again to the system 500 of FIG. 5, vehicles H and I within the exclusion zone 502 may not meet the standards or requirements of the exclusion zone 502, but may still meet the requirements of a nearby exclusion zone 504. In such an instance, the vehicles H and I can transfer from exclusion zone 502 to exclusion zone 504 where the vehicles C, D, E and G would receive instructions and make appropriate adjustments to accommodate vehicles H and I to enable them to join the exclusion zone 504.

Figure 6:
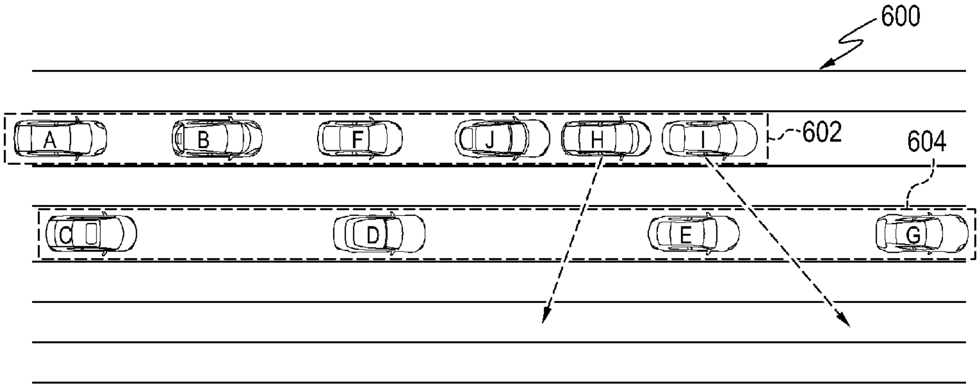

In yet another scenario, a security component, upon rejecting a new vehicle from a network can also communicate a warning signal to the vehicle if it is within some distance D of the geographical boundaries of the flagged network. The security component can communicate an alert signal to the vehicle if it has entered the geographical boundaries of the flagged network. A signal may also be sent to a regulatory authority for the levying of fines or other appropriate actions in response to actions outside the scope of an exclusion zone. In the system 600 of FIG. 6, vehicles H and I currently within exclusion zone 602 may not meet the requirements of the exclusion zone 602. Vehicles H and I may also fail to meet the requirements of another exclusion zone 604. In such an instance, the vehicles H and I would be instructed to safely exit exclusion zone 602 and to further avoid exclusion zone 604.

Currently, no other known solutions exist for automatically determining the geographic boundaries of an ad hoc road network for safe operation of communicatively coupled vehicles. Examples of statically determined boundaries include toll roads that exclude vehicles unable to a pay toll, parkways that exclude certain types of vehicles (e.g. trucks), and High Occupancy Vehicles or HOV lanes which regulate access based on the number of passengers in a vehicle. None of these examples involve communicatively coupled vehicles, ad hoc networks for exchanging information over discovered interfaces or vehicle parameters, or an automatic determination and enforcement of geographical boundaries on the network.

Toll roads can experience added revenues and more efficient use of roads using the aforementioned examples. For example, toll roads can be regulated on an ad hoc basis by coupling the geographical mapping component to a toll authority. In this manner, when vehicles enter the geographical boundaries of a secured and flagged ad hoc network such as an exclusion zone, they may either pay a fine for violating the boundaries of an exclusion zone without security clearance or pay a toll to enter and enjoy the added features that the geographically restricted network of the exclusion zone. Trucks may be excluded from certain sections of roads on an ad hoc basis because they do not support interfaces or vehicle parameters employed by passenger vehicles on those sections coupled in a geographically restricted, flagged ad hoc network. Similarly, passenger vehicles may be excluded from sections of the roadway flagged by a truck network that supports certain truck-only interfaces or vehicle parameters.

HOV lanes may be determined dynamically by interfaces or vehicle parameters between vehicles that establish vehicle "greenness." In this way, once a network establishes an exclusion zone with vehicles that support minimum passenger counts or numbers and it is determined that certain vehicles have more passengers than other vehicles, a regulatory element may instruct the flagging component to establish an ad hoc HOV section of the road to allow only those vehicles with a minimum number of passengers (determined dynamically) to enter.

For clarification, the term "vehicle parameter" as generally used herein refers to any parameter associated with a vehicle. Such parameters include and are not limited to engine parameters, braking parameters, environmental parameters, communication parameters, hardware parameters, software parameters, operating system parameters, interface parameters, or other performance parameters. The term "vehicle" as generally used herein refers to a moving device such as a car, truck, or motorcycle, but can include boats, trains, and airplanes. The term "platooning" as generally used herein refers to when two or more communicating vehicles share one or more common standards or vehicle parameters and can operate cooperatively by communicating and sharing information about their respective vehicle parameters.

As will be appreciated by one skilled in the art, aspects of the various examples may be embodied as a system, method, or computer program product. Accordingly, examples herein may take the form of an entirely hardware example, an entirely software example (including firmware, resident software, micro-code, etc.) or an example combining software and hardware aspects that may all generally be referred to herein as a "circuit," "module" or "system." Furthermore, aspects herein may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to examples of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
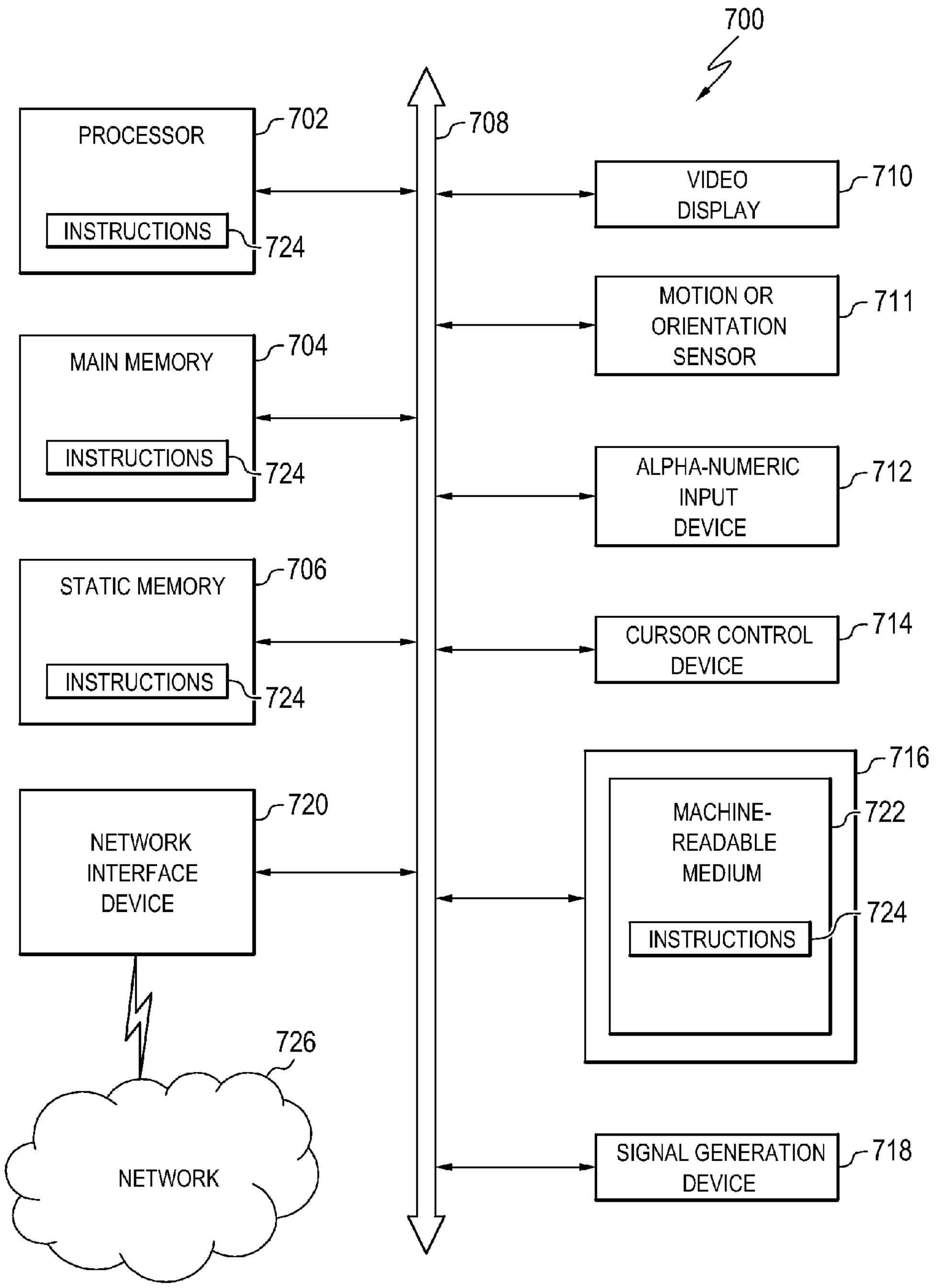
FIG. 7 is a block diagram illustrating a detailed view of a device according to one example of the present invention.

FIG. 7 depicts an example diagrammatic representation of a machine in the form of a computer system 700 within which a set of instructions, when executed, may cause the machine to perform any one or more of the methods discussed above. One or more instances of the machine can operate, for example, as the communication device 101, 111, or 121 as illustrated in FIG. 1. In some examples, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may include a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a device herein includes broadly any electronic device that provides image capturing or voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel display, or a solid state display, or a combination). The computer system 700 may include a motion or orientation sensor 711, an input device 712 (e.g., a keyboard), a cursor control device 714 (e.g., a mouse or trackpad), a memory device 716 such as disk drive unit or solid state memory, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute non-transitory tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various examples broadly include a variety of electronic and computer systems. Some examples implement functions in two or more specific interconnected hardware modules or devices with related control and data signals communicated between and through the modules, or as portions of an application-specific integrated circuit. Thus, the example system is applicable to software, firmware, and hardware implementations.

In accordance with various examples, the methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

While the tangible computer-readable storage medium 722 is shown in an example to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the examples with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZIGBEE), and long-range communications (e.g., WiMAX, GSM, CDMA, LTE) are contemplated for use by computer system 700.

The illustrations of examples described herein are intended to provide a general understanding of the structure of various examples, and they are not intended to serve as a complete description of all the elements and features of apparatus and systems that might make use of the structures described herein. Many other examples will be apparent to those of skill in the art upon reviewing the above description. Other examples may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific examples have been illustrated and described herein, it should be appreciated that any arrangement calculated to achieve the same purpose may be substituted for the specific examples shown. The examples herein are intended to cover any and all adaptations or variations of various examples. Combinations of the above examples, and other examples not specifically described herein, are contemplated herein.

The Abstract is provided with the understanding that it is not intended be used to interpret or limit the scope or meaning of the claims. In addition, in the foregoing Detailed Description, various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

Although only one CPU 702 is illustrated for computer 700, computer systems with multiple CPUs can be used equally effectively. Examples of the present invention further incorporate interfaces that each includes separate, fully programmed microprocessors that are used to off-load processing from the CPU 702. An operating system (not shown)

included in the main memory is a suitable multitasking operating system such as any of the Linux, UNIX, Windows, and Windows Server based operating systems. Examples of the present invention are able to use any other suitable operating system. Some examples of the present invention utilize architectures, such as an object oriented framework mechanism, that allows instructions of the components of operating system (not shown) to be executed on any processor located within the information processing system. The network adapter hardware 720 is used to provide an interface to a network 726 as illustrated. Examples of the present invention are able to be adapted to work with any data communications connections including present day analog and/or digital techniques or via a future networking mechanism.

Figure 8:
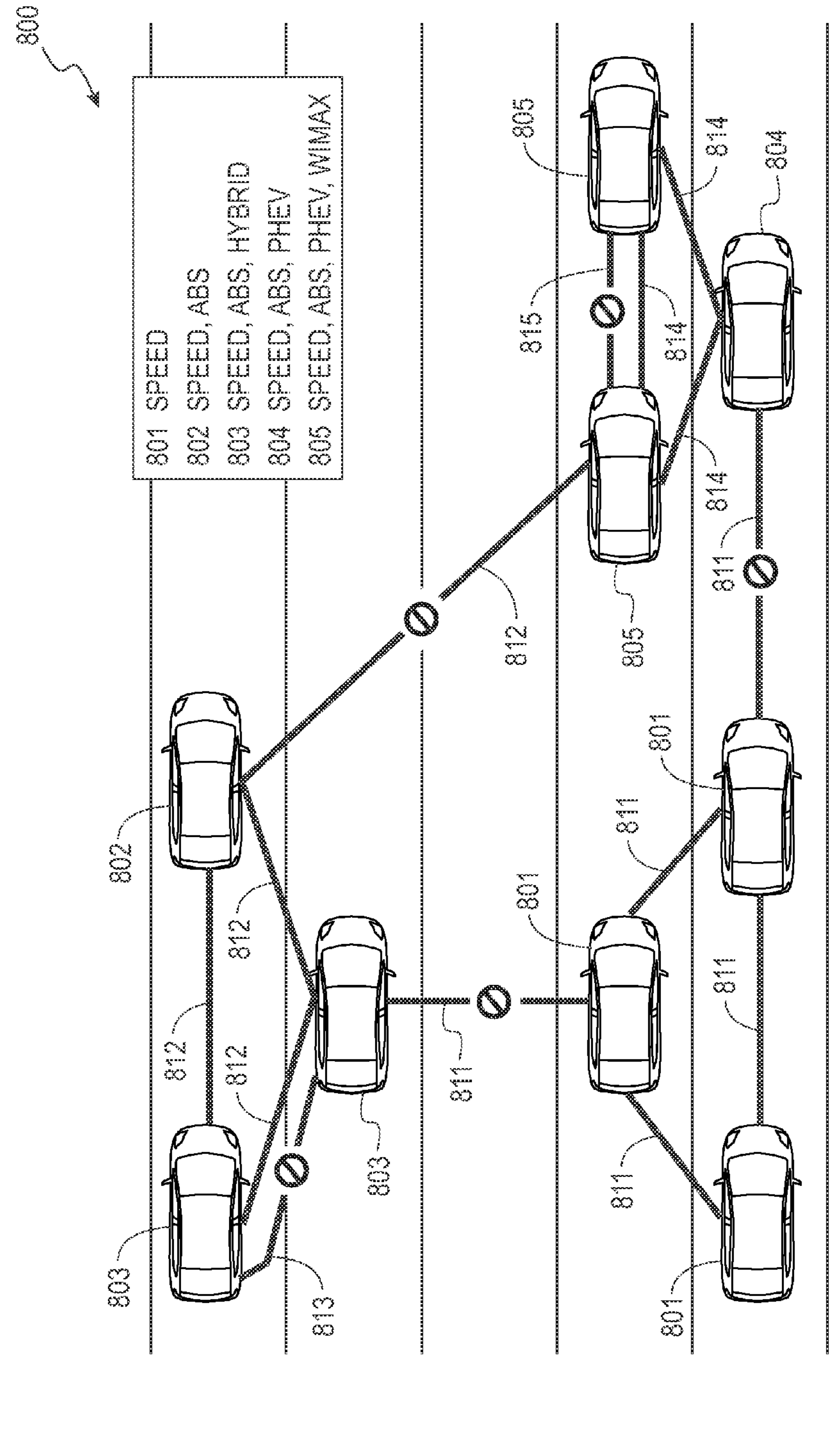
FIG. 8 is a graph of nodes, each node representing a communicating vehicle, and of edges corresponding to parameters of the communicating vehicles.

FIG. 8 is a graph 800 of nodes 801-805, each node representing a communicating vehicle, and of edges 811-815 corresponding to parameters of the communicating vehicles.

Although the illustrative examples of the present invention are described in the context of a fully functional computer system, those of ordinary skill in the art will appreciate that various examples are capable of being distributed as a program product via CD or DVD, e.g. CD, CD ROM, or other form of recordable media, or via any type of electronic transmission mechanism.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", or "processing system" describe examples of a suitably configured processing system adapted to implement one or more examples herein. Any suitably configured processing system is similarly able to be used by examples herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more examples of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The term "electronic device" is intended to broadly cover many different types of computing systems and processing systems used by persons. The term "communication device" is intended to broadly cover many different types of electronic devices used by persons, and that can receive signals transmitted from other devices or processing systems, and optionally can transmit signals to other devices or processing systems for reception by the other devices or processing systems, to communicate with other devices or processing systems, and may also operate in a communication system. The terms "wireless device" and "wireless communication device" are intended to broadly cover many different types of communication devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a personal computer, a laptop personal computer, a tablet computer, a personal digital assistant, and other similar communication devices.

The term "portable electronic device" is intended to broadly cover many different types of electronic devices that are portable or that can be transported between locations by a user. For example, and not for any limitation, a portable electronic device can include any one or a combination of the following: a wireless communication device, a laptop personal computer, a notebook computer, a desktop computer, a personal computer, a smart phone, a Personal Digital Assistant, a tablet computer, gaming units, remote controller units, and other handheld electronic devices that can be carried on one's person.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope and spirit of the examples presented or claimed. The disclosed examples were chosen and described in order to best explain the principles of the examples and the practical application, and to enable others of ordinary skill in the art to understand the various examples with various modifications as are suited to the particular use contemplated. It is intended that the appended claims below cover any and all such applications, modifications, and variations within the scope of the examples.

What is claimed is:

1. A method for managing vehicles on a road network, the method comprising:
- accessing a matrix of vehicle performance parameters of a plurality of communicating vehicles on the road network;
- representing the plurality of communicating vehicles in a graph with a plurality of nodes corresponding to the plurality of communicating vehicles and edges corresponding to the vehicle performance parameters;
- partitioning, with a processing device, the graph to reduce disruptions to the road network below a threshold level to support safe and efficient traffic flow;
- assigning one or more exclusion zones within the road network to each partition of the graph by associating the vehicle performance parameters for each vehicle;
- establishing, based on analysis of the vehicle performance parameters of the plurality of communicating vehicles, a set of security requirements for additional vehicles to join the plurality of communicating vehicles on the road network;
- identifying geographical boundaries of the road network;
- establishing a policy prohibiting vehicles that are unable to pass the set of security requirements from entering the geographical boundaries of the road network; and
- wirelessly communicating, with a processing device, between a central computing facility and at least one of the plurality of communicating vehicles to enforce the one or more exclusion zones.

2. The method of claim 1, wherein the processing device is a remote server in communication with the plurality of communicating vehicles.

3. The method of claim 1, wherein the processing device comprises one or more communication devices forming an ad hoc network providing communication access among the plurality of communicating vehicles.

4. The method of claim 1, comprising a list of inputs forming the matrix of vehicle parameters used by at least two communicating vehicles on the road network.

5. The method of claim 4, wherein the list of inputs comprises one or more of a model vehicle, a current location coordinate, a destination location coordinate, a determined speed, a determined minimum distance between vehicles, a determined wind drag factor, an engine parameter, a braking parameter, a communication bandwidth parameter, an environmental condition, and a governmental regulation.

6. The method of claim 1, wherein the method wirelessly communicates with warnings, alerts and fines to vehicles within the one or more exclusion zones that fail to support at least one interface among the matrix of vehicle parameters required to enter and remain in a roadway network.

7. The method of claim 1, wherein the method wirelessly communicates with a fine to one or more vehicles within the one or more exclusion zones that fail to support at least one interface for a predetermined time limit that is exceeded.

8. The method of claim 1, wherein the partitioning comprises applying a graph partition algorithm to the graph.

9. The method of claim 1, comprising the step of managing the plurality of communicating vehicles autonomously by enforcing the one or more exclusions.

10. A method for managing vehicles on a road network, the method comprising:
- accessing a matrix of vehicle parameters of a plurality of communicating vehicles on the road network;
- representing the plurality of communicating vehicles in a graph with a plurality of nodes corresponding to the plurality of communicating vehicles and edges corresponding to the vehicle parameters;
- partitioning, with a processing device, the graph to reduce disruptions to the road network below a threshold level to support safe and efficient traffic flow;
- assigning one or more exclusion zones within the road network to each partition of the graph by associating the vehicle parameters for each vehicle;
- establishing, based on analysis of the vehicle parameters of the plurality of communicating vehicles, a set of security requirements for additional vehicles to join the plurality of communicating vehicles on the road network, wherein the set of security requirements includes determining whether a vehicle attempting to communicate with another vehicle on the road network supports interfaces used by the another vehicle on the road network;
- identifying geographical boundaries of the road network; and
- determining whether the road network should be made geographically isolated based on criteria set by interfaces parameters upon which the road network is built, a size of the road network, and a risk factor computed derived from the interface parameters,
- wherein the method wirelessly communicates with warnings, alerts and fines to vehicles within the one or more exclusion zones that fail to support at least one interface among the matrix of vehicle parameters required to enter and remain in the road network.

11. The method of claim 10, wherein the processing device is a remote server in communication with the plurality of communicating vehicles.

12. The method of claim 11, wherein the processing device comprises one or more communication devices forming an ad hoc network providing communication access among the plurality of communicating vehicles.

13. The method of claim 10, comprising a list of inputs forming the matrix of vehicle parameters used by at least two communicating vehicles on the road network.

14. The method of claim 13, wherein the list of inputs comprises one or more of a model vehicle, a current location coordinate, a destination location coordinate, a determined speed, a determined minimum distance between vehicles, a determined wind drag factor, an engine parameter, a braking parameter, a communication bandwidth parameter, an environmental condition, and a governmental regulation.

15. The method of claim 10, wherein the partitioning comprises applying a graph partition algorithm to the graph.

16. The method of claim 10, comprising the step of managing the plurality of communicating vehicles autonomously by enforcing the one or more exclusions.

* * * * *